(12) United States Patent
Olsommer et al.

(10) Patent No.: US 12,479,173 B2
(45) Date of Patent: Nov. 25, 2025

(54) METHOD AND DEVICE FOR MANUFACTURING COMPOSITES MADE FROM MULTI-FILAMENT FIBERS

(71) Applicant: COMPAGNIE GENERALE DES ETABLISSEMENTS MICHELIN, Clermont-Ferrand (FR)

(72) Inventors: David Olsommer, Clermont-Ferrand (FR); Antonio Delfino, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 57 days.

(21) Appl. No.: 18/265,807

(22) PCT Filed: Nov. 26, 2021

(86) PCT No.: PCT/FR2021/052102
§ 371 (c)(1),
(2) Date: Jun. 7, 2023

(87) PCT Pub. No.: WO2022/123139
PCT Pub. Date: Jun. 16, 2022

(65) Prior Publication Data
US 2024/0051245 A1   Feb. 15, 2024

(30) Foreign Application Priority Data

Dec. 7, 2020   (FR) ...................... 2012755

(51) Int. Cl.
*B29C 70/52*   (2006.01)
(52) U.S. Cl.
CPC .......... *B29C 70/523* (2013.01); *B29C 70/528* (2013.01)

(58) Field of Classification Search
CPC ..... B29C 70/52; B29C 70/521; B29C 70/523; B29C 70/526
See application file for complete search history.

(56) References Cited

U.S. PATENT DOCUMENTS

| 4,983,453 A | * | 1/1991 | Beall ..................... B29C 70/083 |
| | | | 442/415 |
| 6,926,853 B2 | | 8/2005 | Hinc et al. |
| | | | (Continued) |

FOREIGN PATENT DOCUMENTS

| EP | 0290849 A2 | 11/1988 |
| EP | 1174250 A1 | 1/2002 |
| EP | 1506085 A1 | 2/2005 |

OTHER PUBLICATIONS

International Search Report dated Mar. 14, 2022, in corresponding PCT/FR2021/052102 (4 pages).

*Primary Examiner* — Matthew J Daniels
(74) *Attorney, Agent, or Firm* — VENABLE LLP

(57) ABSTRACT

A process for the manufacture of an elongate composite element comprising a bundle (20) of multifilament fibers embedded in a composition based on a polymerizable substance comprising the following comprises: arranging multifilament fibers in the form of several individual strands, so that a first strand (20a) is located at the center of the bundle and that the other strands are positioned around the first strand; and carrying along the arrangement of multifilament fibers in order to subject it, in the direction of forward progression, to degassing of said arrangement of fibres by the action of vacuum, impregnation of the arrangement of fibres with the composition, passage of the first impregnated strand through a first die (10a) which carries out its partial polymerization, passage of all the strands through a last die (10f) which brings them together in a single strand (20f), and exposure of the single strand (20f) to a source of radiation in
(Continued)

order to carry out an additional polymerization to obtain the elongate composite element.

5 Claims, 3 Drawing Sheets

(56) References Cited

U.S. PATENT DOCUMENTS

| | | |
|---|---|---|
| 7,041,909 B2 | 5/2006 | Hiel et al. |
| 7,060,326 B2 | 6/2006 | Hiel et al. |
| 7,211,319 B2 | 5/2007 | Hiel et al. |
| 7,368,162 B2 | 5/2008 | Hiel et al. |
| 7,484,949 B2 | 2/2009 | Hinc et al. |
| 2003/0015827 A1 | 1/2003 | Hinc et al. |
| 2004/0131834 A1 | 7/2004 | Hiel et al. |
| 2004/0131851 A1 | 7/2004 | Hiel et al. |
| 2004/0132366 A1 | 7/2004 | Hiel et al. |
| 2005/0173823 A1 | 8/2005 | Hinc et al. |
| 2005/0227067 A1 | 10/2005 | Hiel et al. |
| 2015/0318080 A1 | 11/2015 | Mekala et al. |
| 2017/0050468 A1* | 2/2017 | Delfino .................. D02G 3/18 |

* cited by examiner

METHOD AND DEVICE FOR MANUFACTURING COMPOSITES MADE FROM MULTI-FILAMENT FIBERS

BACKGROUND

The present invention relates to processes for the continuous manufacture of elongate composite materials produced by impregnation of multifilament fibres with a polymerizable composition and it relates more particularly to a process for the manufacture of composites in the form of single strands, such as of the GRC (for glass-resin composite) type comprising continuous unidirectional multifilament glass fibres embedded in a polymerizable resin.

The document EP 1 174 250 describes a process and a facility for the continuous impregnation of very long fibres with resin in order for the manufacture of very long elongate composite elements, which composites comprise reinforcing fibres embedded in a cured resin matrix. The process described comprises a step of carrying along a bundle of reinforcing fibres from a fibre storage reel in order to pass it through a vacuum enclosure and then through an impregnation chamber where the fibres are impregnated with resin, followed by a step during which the impregnated fibres pass through a calibration die after the shape of the prepreg has been stabilized beforehand by an at least partial polymerization of the resin of the prepreg. Calibration dies of predetermined shape and predetermined dimensions are also present at the inlet of the vacuum enclosure and before the impregnation chamber. The facility comprises a pull roll, which carries along the fibres from the fibre storage reel, and a reel for receiving the prepreg.

Although functioning satisfactorily, it turned out that it was difficult to increase, beyond certain limits, the diameter of the composite manufactured with this facility. The need to manufacture composites of large diameters thus made itself felt.

One solution to this problem would be to subject a bundle of fibres, which is impregnated with resin, obtained with a facility for the continuous manufacture of fibres of the type described above to the oven in order to obtain polymerization at the core of the bundle. However, such a process would consume time and energy.

The documents EP 1 506 085 A1 and US 2015/318080 A1 describe different processes for the manufacture of composite materials in the form of cords.

Another solution to this problem has been described in document EP 0 290 849. According to this document, a bundle of fibres which are impregnated with resin is produced by pultrusion by passing the bundle through a bath of resin, then by passing it through a die and exposing it to UV radiation. The polymerization of the bundle takes place gradually, from the outside towards the inside of the bundle, while the latter travels the length of a transparent die or through a liquid medium delimited by two leaktight nozzles, while being exposed to UV radiation. While admittedly making possible better polymerization at the core of the bundle, this process proves to be quite slow and is not suitable for the manufacturing rates of an industrial process.

An objective of the invention is to overcome the disadvantages of the abovementioned documents and to provide an original solution for a process and a device for the polymerization of multifilament fibres for a facility for the continuous manufacture of elongate composite materials making it possible to obtain composites having cross sections of large dimensions with a high productivity.

SUMMARY

This objective is achieved by the invention, which provides a process for the continuous manufacture of an elongate composite element comprising a bundle of multifilament fibres embedded in a composition based on a polymerizable substance comprising the following steps:

arranging multifilament fibres of said bundle in the form of several individual strands, each comprising several multifilament fibres, so that a first strand is located at the centre of the bundle and that the others are positioned around the first strand, carrying along said arrangement of multifilament fibres in order to subject it, in the direction of forward progression, to:

degassing of said arrangement of fibres by the action of vacuum, impregnation of said arrangement of fibres with said composition in order to obtain impregnated strands, passage of the first impregnated strand through a first die which carries out a partial polymerization of the composition, passage of all the strands through a final die which brings them together in a single strand;

exposure of said single strand to a source of radiation in order to carry out an additional polymerization so as to obtain said elongate composite element.

DETAILED DESCRIPTION

Elongate composite element comprising a bundle of multifilament fibres embedded in a composition based on a polymerizable substance is understood to mean a composite element of great length which is manufactured continuously from one or more reels for feeding with multifilament fibres in order to form a bundle which is carried along in order to successively carry out the impregnation of its fibres with polymerizable organic substance and the polymerization of the substance as the bundle moves through.

In other words, with the process of the invention, a bundle to be impregnated is put together from several strands of multifilament fibres and a selective and successive polymerization of the different strands is carried out so as to begin the polymerization of the impregnated multifilament fibres at the core of the bundle and to finish it at the periphery of it. This makes it possible to obtain an elongate composite element based on multifilament fibres, the shape and dimensions of which are well controlled and the mechanical properties of which are homogeneous, this being the case over its entire length. Preferably, the additional polymerization leads to a definitive polymerization of the composition.

Thus, the process of the invention makes it possible to obtain composite elements having a cross section of large dimensions, this being done at a high manufacturing rate. By way of example, for a GRC (for glass-resin composite) composite, it is possible to obtain, with the process of the invention, sections having a diameter of between 10 and 30 mm for a rate of approximately 50 m/min.

The process of the invention can also be used for the production of composite elements with sections having diameters of between 0.5 and 10 mm having the aim of achieving higher accuracy of shapes than the same sections produced in a single operation according to the process described in the document EP 1 174 250 already cited.

Thus, it has been observed that, by producing a partially polymerized nucleus at the core of the bundle, the following layers attach well to this nucleus, which makes it possible to obtain a final composite, the section of which is well controlled and the production rate of which is high.

This is because it has been found, during the tests carried out in the laboratory, that the resin no longer flowed through the impregnated fibres of the bundle under the effect of gravity, as in the facilities of the state of the art, but indeed, on the contrary, the different successive layers of fibres attach well to the prepolymerized nucleus up to the definitive stabilization of their shape after passage through the last die and final polymerization of the composite. By way of example, for a GRC (for glass-resin composite) composite, it is possible to obtain, with the process of the invention, an elongate composite element of great (or continuous) length having a circular section with a diameter of between 0.5 and 2.5 mm with a tolerance of 0.05 mm and a rate of between 100 and 200 m/min.

Partially polymerized or prepolymerized nucleus is understood to mean a composite nucleus of multifilament fibres embedded in a composition based on a polymerizable substance, the degree of polymerization of which has been stopped when this degree of polymerization has reached at most a few percent of the complete polymerization, typically between 0.5% and 5%. The degree of polymerization can be evaluated using a measuring instrument of DSC (Differential Scanning calorimetry) type.

The complete polymerization of the composite is obtained when the degree of polymerization of the resin is close to 100%, typically greater than 95%, when the composite is measured with a device of DSC type.

The arrangement of the strands and the successive passages through at least the first and the last die are carried out so that the strands are brought to converge, starting from an impregnation chamber at the outlet of which the arrangement is the most expanded, towards the final die where it is contracted to form said single strand. This makes it possible to have a bundle split into several strands at the start of the process and to pass at least the central strand through a die which can act at the core of the bundle. A staged polymerization of the bundle is thus carried out, with a first polymerization stage which takes place at the core of the bundle and a final stage which takes place when all the strands are joined together into a final single strand with a view to subjecting it to an additional polymerization.

Said arrangement of multifilament fibres can comprise a central strand, several intermediate strands positioned to form at least one intermediate layer surrounding the central strand and at least one outer layer of peripheral strands, in which each intermediate layer of intermediate strands passes through an intermediate die which carries out the partial polymerization of the composition.

This makes it possible to have a staged polymerization having several stages and to thus produce composites of larger section.

The cross section of said composite element can be circular. This section can, however, take any other shape: polygonal, oval, elliptic, tubular, and the like, in particular by appropriately choosing the shape of the dies.

Multifilament fibre is understood to mean a fibre which comprises several elementary filaments arranged side-by-side to form a bundle, the elementary fibres of which are unidirectional, being substantially parallel to one another.

The multifilament fibres can be selected from the group consisting of glass fibres, carbon fibres, silica fibres, ceramic fibres and the mixtures of such fibres, preferably from the group consisting of glass fibres, carbon fibres and the mixtures of such fibres, and more preferentially still said multifilament fibres can be glass fibres. These fibres are used to produce elongate composites produced by impregnation of the multifilament fibres with a polymerizable composition.

The polymerizable substance can be of the thermosetting type, preferably thermocrosslinkable type, and more preferentially still of the vinyl ester type. Polymerizable substance is understood to mean a substance comprising, by weight, more than 50%, preferably more than 75% and more preferentially still more than 90% of organic substance. This substance can thus be a thermopolymerizable polymeric substance, for example based on unsaturated polyester, polyepoxide, derivative of phenol or aminoplast. Preferably, the polymerizable substance is crosslinked. It is, for example, a resin which can be crosslinked by ionizing radiation, it being possible for the final polymerization to be triggered and controlled easily by means of an ionizing treatment, for example of the UV or UV-visible type. Use is preferentially made, as crosslinked polymerizable substance, of a polyester resin (based on unsaturated polyester) or more preferentially still of a vinyl ester resin.

The objective of the invention is also achieved with a device for the continuous manufacture of an elongate composite element comprising a bundle of multifilament fibres embedded in a composition based on a polymerizable organic substance, comprising means making it possible to produce an arrangement of multifilament fibres of said bundle in the form of several individual strands, each strand comprising several fibres, so that a first strand is located at the centre of the bundle, means for degassing said arrangement and means for impregnation of said arrangement with a composition based on a polymerizable material, a first die capable of receiving said first strand with a view to its partial polymerization and at least one final die capable of receiving all the strands in order to form a single strand and means for polymerization of said single strand using a radiation device so as to obtain said elongate composite element.

The device according to the invention can comprise at least one intermediate die located between said first die and said last die.

Said first die and said intermediate die can comprise annular UV radiation lamps comprising, in their central part, a guide tube for a strand.

Said annular lamp can comprise a disc for supporting several light-emitting diodes (LEDs) provided with a central opening through which said guide tube passes, and also a reflector capable of sending the radiation emitted by the light-emitting diodes (LEDs) in the direction of the outlet of said guide tube, means for cooling the lamp and means for supplying the latter with electricity.

Said cooling means may comprise a water cooling circuit and/or a device for producing an air or nitrogen flow. The water cooling circuit ensures rapid and efficient cooling of the lamp. Cooling using an air or nitrogen flow is easier to carry out, as they do not require sealing elements, as is the case for a water cooling circuit. In addition, the presence of nitrogen promotes the surface polymerization of the organic substance which encompasses the fibres because the presence of atmospheric oxygen acts as a polymerization reaction inhibitor.

The internal section of each guide tube can gradually increase from upstream to downstream between the first die and the last die. This makes possible a gradual polymerization, from the core of the bundle, of the various layers of impregnated fibres surrounding the central strand.

A better understanding of the invention will be obtained by virtue of the continuation of the description, which is based on the following figures:

BRIEF DESCRIPTION OF THE FIGURES

In the various figures, identical or similar elements carry the same reference. Their description is thus not systematically repeated.

FIG. 1 diagrammatically illustrates a device 1 for the manufacture of an elongate composite element of great length. In the example illustrated in the figures, this composite is a GRC single strand comprising glass filaments embedded in a thermosetting resin. The single strand can take any known shape; it can, for example, be a cylindrical single strand of large diameter, for example ranging up to 10 to 30 mm, thus having a cross section of circular shape. The device of the invention makes possible, of course, the manufacture of single strands of rectangular, oval or other cross section. The glass filaments are present in the form of essentially unidirectional multifilament fibres each formed of a plurality of unitary glass filaments each having a mean diameter of the order of 5 to 30 The resin is of the thermosetting or crosslinkable type is understood to mean that the resin is polymerizable or curable (photocurable and/or thermosetting) by being based on a thermosetting polymer. The glass transition temperature of the resin Tg is preferably greater than 160° C., more preferentially greater than 170° C., in particular greater than 180° C.

In FIG. 1, there is observed a bundle 20 of multifilament fibres which enters the device 1, the bundle being represented diagrammatically in the other figures by an arrow E, the direction of which indicates the direction of forward progression of the bundle with respect to the device 1, which is itself fixed. The bundle 20 enters the device through an inlet plate 4 into a vacuum chamber 2, in the form of several strands of multifilament fibres continuously unwound from different reels 9 of a feed device 8. In general, the fibres are delivered in rovings, that is to say in groups of fibres wound in parallel on a reel and identified by their Tex code. The bundle, originating from the feed device 8, passes through the device 1 by progressing in the direction of the arrow E, being set in motion by a drive device located at the outlet of the device 1 (it is understood after the outlet of the radiation device 50, indeed even the direction of the arrow S, as will be explained later). The drive device (not represented) is, for example, of the type comprising a motorized traction drum making it possible to wind the composite element around its axis or comprising two motorized drums facing each other, being spaced apart by a distance at least equal to the thickness of the composite element, and which rotate in opposite directions to carry along the composite element, by friction, in a translational movement, passing it through the space located between the two drums. The device 1 successively comprises: a vacuum chamber 2, an impregnation chamber 3 and two dies 10a and 10b called polymerization dies, a last die 10f, called the calibration die, through which passes the single strand 20f finally obtained, and a radiation device 50 for it. Radiation device 50 is understood to mean a UV and/or IR radiation device which carries out the additional, preferably final, polymerization of the single strand exiting from the last die 10f.

Figure 2:
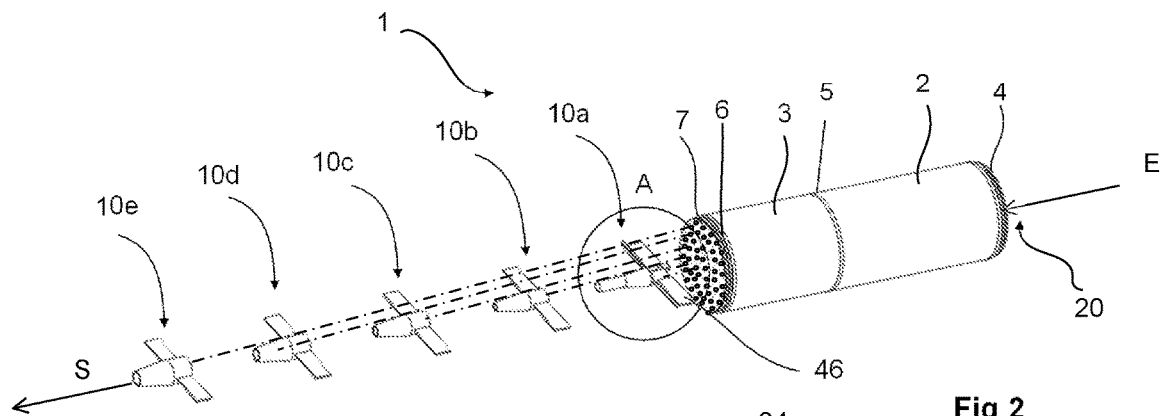
FIG. 2 is a diagrammatic perspective view illustrating the main components of another embodiment of the device of the invention.

There are observed, in FIG. 2, the main components of the device 1 according to another embodiment of the invention which successively comprises: a vacuum chamber 2, an impregnation chamber 3 and several dies 10a to 10e called polymerization dies. The last die 10f, called the calibration die, and also the radiation device 50, which is positioned before the exit of the device, are visible in FIG. 4. The vacuum chamber 2 is delimited axially by a rigid inlet plate 4, provided with through-holes, and a rigid separation plate 5, also provided with through-holes which are located axially opposite those of the plate 4. The fibres, divided into several strands, are introduced into the vacuum chamber by making them pass through the various orifices of the plate 4 and exit from it through the orifices going through the plate 5 so that the strands travel paths which are linear and parallel to one another from one plate to the other while being parallel to the longitudinal axis X-X' of the device. The vacuum chamber is connected to a vacuum pump (not represented) which maintains a pressure level of approximately 0.1 bar in the vacuum chamber 2, despite the passage of the fibres through openings having diameters greater than those of the strands going through them. The impregnation chamber 3 is a sealed enclosure, delimited by the intermediate plate 5 and by a rigid outlet plate 6, also provided with through-holes 7 located axially opposite those of the intermediate plate 5. The number of orifices 7 corresponds to the number of strands which make up the bundle 20. The impregnation chamber is fed with resin originating from an external tank (not represented) via an inlet pipe (not represented) on the top, the chamber also comprising, on the bottom, a pipe (not represented) for discharge of the resin. The impregnation chamber 3 is totally filled with resin so that the fibres exiting from the vacuum chamber 2 pass through it while following paths which are linear and parallel to one another and are completely impregnated with resin.

It is of course necessary, before putting the device 1 of the invention into operation, to pass all the strands of the bundle to be impregnated, starting from storage reels 9, while passing through the orifices of the plates 4, 5 and 6, through all the dies and the radiation device 50 and up to the drive means which ensures the tensioning of all the strands of the bundle according to a pre-established arrangement of multifilament fibres.

Figure 1:
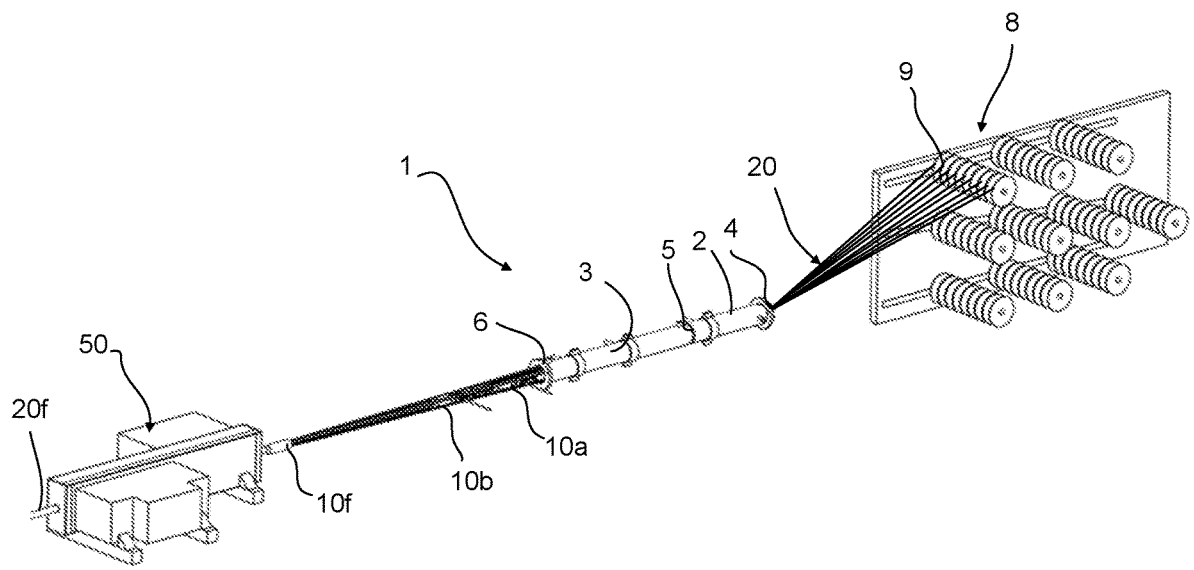
FIG. 1 is a perspective view illustrating the components of a device for the manufacture of an elongate composite element according to a preferred embodiment of the invention.
Figure 4:
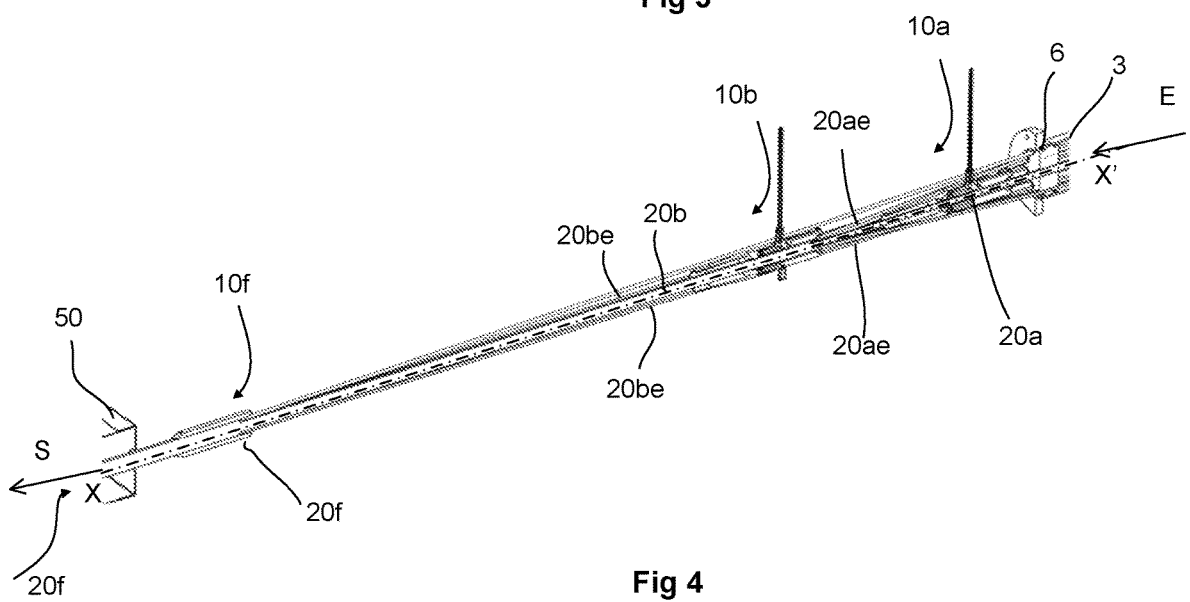
FIG. 4 illustrates by a perspective view on a larger scale the device of FIG. 1.
Figure 5:
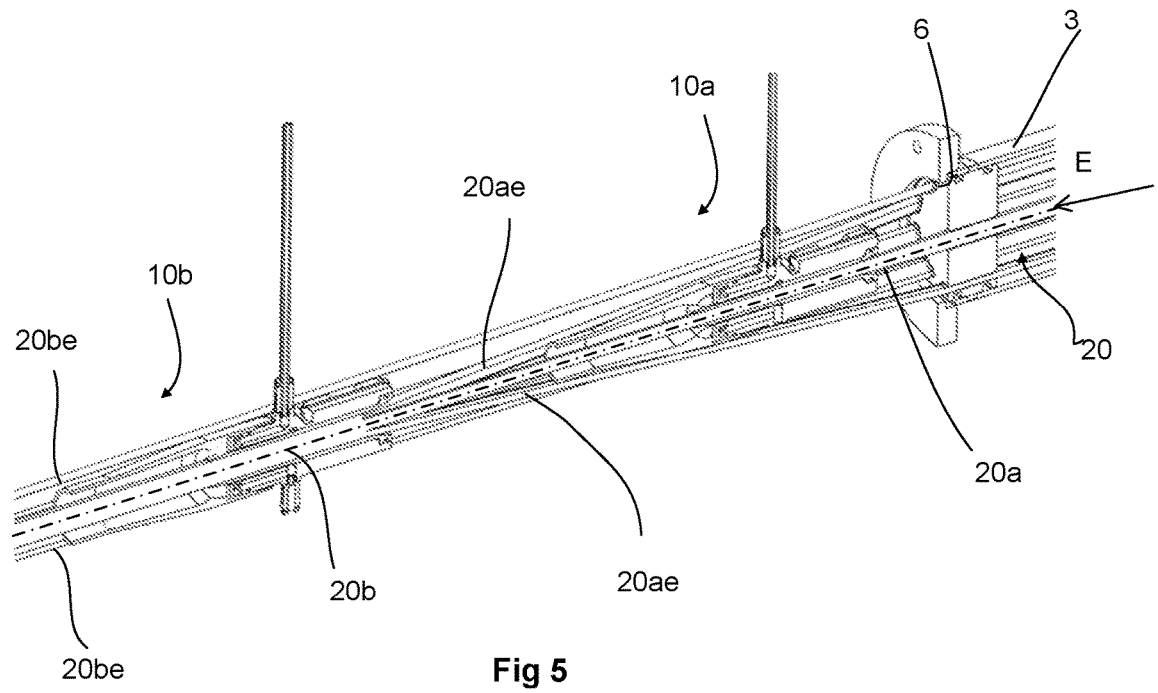
FIG. 5 illustrates the right part of the device of FIG. 4 on an enlarged scale.

By way of example, if it is desired to obtain a cylindrical composite element having an external diameter of 19 mm, using a device presented in FIGS. 1, 4 and 5, an arrangement of approximately 80 elementary bundles of multifilament fibres is used, each of these 80 elementary bundles arriving in the device from a reel 9 of 4800 Tex roving. The arrangement of the 80 elementary bundles is made as follows: a central strand with a diameter of 5.6 mm, itself consisting of an assembly of 8 elementary bundles of multifilament fibres originating from 8 reels of 4800 Tex, and 2 additional rows concentric with the first, the radial thickness of each row of which is approximately 3 mm, each row comprising several concentric strands, the first additional row consisting of 3 strands themselves consisting of 8 elementary bundles originating from 8 reels of 4800 Tex, the second additional row consisting of 6 strands themselves consisting of 8 elementary bundles originating from 8 reels of 4800 Tex, the whole clearly giving a total of 8+3×8+6×8=80 reels of 4800 Tex.

Downstream of the impregnation chamber 3 are found the polymerization dies 10a to 10e and a last calibration die 10f, all the dies being positioned along one and the same axis which is the longitudinal axis X-X' of the device. The bundle 20 is composed of a plurality of strands, originating from the reels 9, forming an arrangement of strands intended to ensure a successive passage of these strands through the various dies of the device. The arrangement of the strands is organized so that the central strand passes through the first die 10a, positioned substantially in the axis of the device, the various intermediate strands being organized in successive rows surrounding the central strand, coaxially with the axis of the central strand, to gradually converge when they go through the dies 10b to 10e until all the strands are joined together to pass through the last die 10f (FIG. 4) and form a single strand 20f.

FIG. 4 illustrates a preferred embodiment of the device comprising a first die 10a, an intermediate die 10b and a last calibration die 10f. It is observed better, with reference to FIG. 5, that the bundle of multifilament fibres 20 comprises a central strand 20a and peripheral strands positioned concentrically to the first. The central strand 20a is intended to pass through the first die 10a which ensures its partial polymerization. The strand exiting from it and the peripheral strands 20ae pass together through an intermediate die 10b which ensures the partial polymerization of the new strand 20b thus formed. The strand 20b exiting from the intermediate die 10b and the remaining peripheral strands 20be pass together through a calibration die 10f which shapes them in order to form a final strand 20f before the definitive polymerization of the latter which takes place in the radiation device 50. The calibration die 10f is a tube having a well-defined shape and dimensions. In an alternative form, the calibration die is of the polymerization die type.

Figure 7:
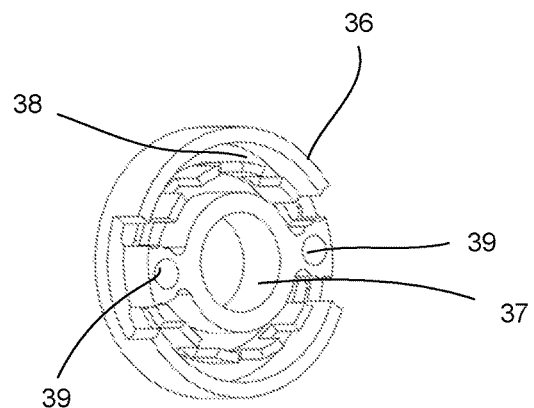
FIG. 7 illustrates by a perspective view on an enlarged scale a piece forming part of the cooling circuit of a lamp forming part of the die of FIG. 6.
Figure 6:
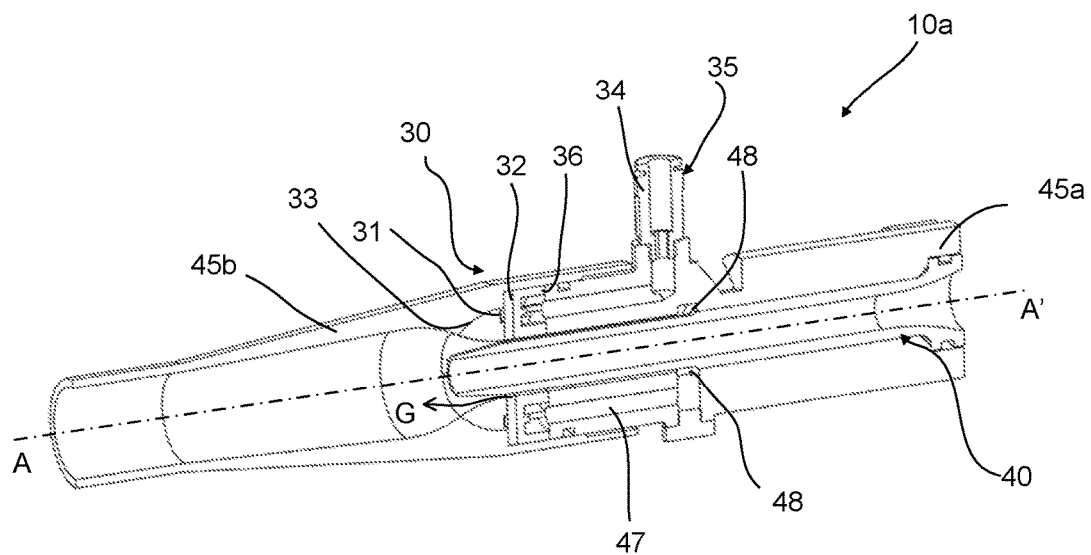
FIG. 6 is a sectional view of a die forming part of the device of the invention.

A description will be given, with reference to FIGS. 3 and 6, of the structure of a polymerization die 10a. The die has an elongated shape of longitudinal axis A-A' and it comprises an annular lamp 30 and a guide tube 40 for a strand of fibres which enters the die. The lamp and the guide tube are held together in a die body 45 in two parts 45a, 45b which is provided with fins for attachment 46 to the device 1. The die body is extended at its outlet end by a tube 41 which directs the bundle exiting from the die towards the following die. The annular lamp 30 is an assembly comprising several LEDs 31 having UV radiation which are connected to one another via a printed circuit on a common support 32 of annular shape centred on the axis A-A'. The annular lamp 30 comprises a reflector 33 capable of sending the radiation emitted by the LEDs in the direction of the outlet of the guide tube 40. By way of example, the annular lamp 30 comprises several high-power LEDs emitting in the wavelength of between 365 and 410 nm, preferentially 385 nm, having a maximum electrical power consumed of between 100 and 500 W and requires cooling during its operation. The die presented in FIG. 3 comprises a liquid cooling circuit (for example water), whereas the die in FIG. 6 comprises an air or nitrogen cooling circuit. The die presented in FIG. 6 comprises a cooling circuit 35 for this purpose comprising an inlet 34 which connects it to a feed of air or nitrogen and a distribution plate 36 (FIG. 7) coming into thermal contact with the support 32. The distribution plate 36 comprises a distribution chamber 38 comprising internal walls forming baffles for the cooling gas, the path of which within the chamber and the die is represented by means of a line provided with arrows in FIGS. 6 and 7. The plate 36 furthermore comprises a central orifice 37 through which the guide tube 40 passes and orifices 39 for receiving the electrical connections of the lamp 30. The gas which was used to cool the distribution plate 36 subsequently emerges from this plate via the conduit 47, in order to subsequently be distributed in the annular chamber 48, then continues in the space provided for this purpose between the pieces 40 and 45a, in order to finally exit concentrically in the space made in the piece 45b along the direction indicated by the arrow G. This flow of gas thus has the dual purpose of first cooling the distribution plate 36 and then secondly of continually purging the interior volume of the piece 45b from any resin solvents in suspension or resin microprojections, and more specifically of guaranteeing the cleanliness of the reflector 33. The polymerization die 10a is positioned within the device 1 so that its longitudinal axis A-A' is coaxial with the axis X-X' of the device.

Figure 3:
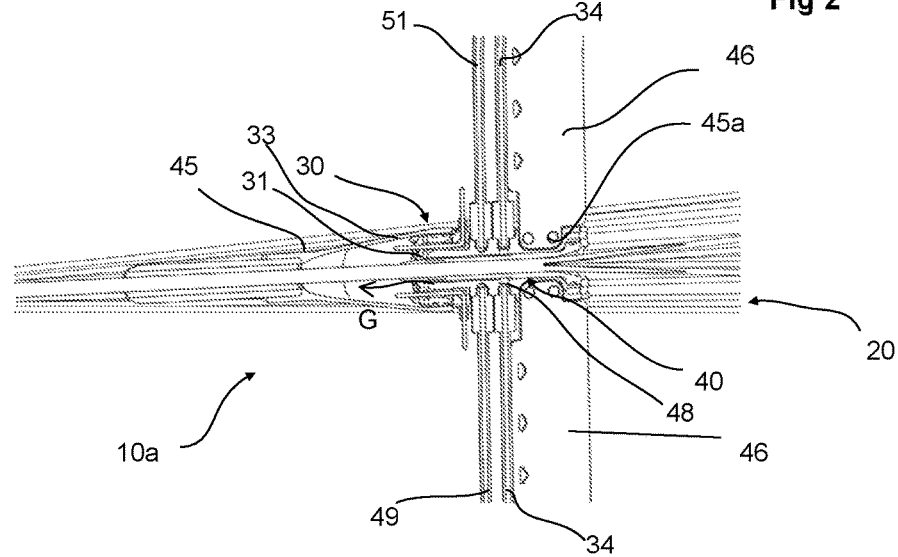
FIG. 3 is a sectional view on an enlarged scale of the feature A of FIG. 2.

The die presented in FIG. 3 for its part has available two inlets 34 for gas, air or nitrogen, leading to an annular conduit 48, then to the interior space of the body 45 along the direction of the arrow G, targeting the same reasons of guarantee of cleanliness of the reflector 33. The die represented in FIG. 3 comprises, in addition to the die represented in FIG. 6, a feed 49 of cooling liquid, leading to a distribution plate (not represented) and then to a conduit 51 returning to the system for circulation and maintenance in temperature of the cooling circuit.

The first step of the process of the invention consists in producing an arrangement of multifilament fibres in several individual strands which form the bundle 20, at the time of its arrival in the device 1, each strand comprising one or more multifilament fibres. The arrangement is produced so that a first strand is positioned at the centre of the device, along the axis X-X' of the latter, and several peripheral strands are positioned around the first strand. Use is made, for this, of an inlet plate 4 in a vacuum chamber 2 comprising several orifices for passage of the strands, including a central orifice and several peripheral orifices. This arrangement is subsequently passed through the separation plate 5 with an impregnation chamber 3 and the outlet plate 6 of the latter. The exiting strands from the impregnation chamber are subsequently passed through the various dies 10a, 10b (indeed even 10c, 10d, 10e for the device of FIG. 2) which each ensure a partial polymerization of the strand which passes through it. The last central strand exiting from the last die 10e passes through a final die 10f. The final die 10f only brings together all the strands at its centre in order to be able to pass the single strand 20f thus obtained through a radiation device 50 which ensures the final polymerization of the single strand. In an alternative form, the final die 10f is of the same type as the intermediate dies and carries out the final polymerization of the single strand 20f which passes through it.

Other alternative forms and embodiments of the invention can be envisaged in the scope of the invention as claimed. The process of the invention can be used with other types of multifilament fibres, indeed even with different types of fibres, within one and the same bundle.

Furthermore, it is possible to envisage the use of the splicing process and device of the invention with a thermally polymerizable organic substance.

It might also be possible to have a bundle delivered by a single reel at the inlet of the device and which is separated into several individual strands.

The invention claimed is:

1. A process for continuous manufacture of an elongate composite element comprising a bundle of strands of multifilament fibers embedded in a composition based on a polymerizable substance comprising the following steps:

arranging strands of multifilament fibers of the bundle in an arrangement of multifilament fibers comprising a central strand, several intermediate strands positioned to form at least one intermediate layer surrounding the central strand, and at least one outer layer of peripheral strands, each strand comprising several multifilament fibers; and carrying along the arrangement of multifilament fibers in order to subject the arrangement of multifilament fibers, in the direction of forward progression, to:

degassing of the arrangement of multifilament fibers by vacuum, impregnation of the arrangement of multifilament fibers with the composition in order to obtain impregnated strands, passage of the central strand, now impregnated, through a first die which carries out a partial polymerization of the composition, passage of each intermediate layer of intermediate strands, now impregnated, through an intermediate die which carries out a partial polymerization of the composition, passage of all the strands through a last die which brings all the strands together in a single elongate element, and exposure of the single elongate element to a source of radiation in order to carry out an additional polymerization so as to obtain the elongate composite element.

2. The process according to claim 1, wherein the arrangement of the multifilament fibers and the successive passages through at least the first and the last die are carried out so that all the strands are brought to converge, starting from an impregnation chamber at an outlet of which the arrangement of multifilament fibers is most expanded, toward the last die where the arrangement of multifilament fibers is contracted to form the single elongate element.

3. The process according to claim 1, wherein a section of the elongate composite element is circular.

4. The process according to claim 1, wherein the multifilament fibers are selected from the group consisting of glass fibers, carbon fibers, silica fibers, ceramic fibers and mixtures thereof.

5. The process according to claim 1, wherein the polymerizable substance is a thermosetting type substance.

* * * * *